(12) United States Patent
Rocznik et al.

(10) Patent No.: US 12,056,608 B2
(45) Date of Patent: Aug. 6, 2024

(54) SYSTEM AND METHOD FOR DISTRIBUTED NEURAL NETWORKS ON EDGE DEVICES

(71) Applicant: Robert Bosch GmbH, Stuttgart (DE)

(72) Inventors: Thomas Rocznik, Mountain View, CA (US); Akshay Malhotra, Fremont, CA (US); Christian Peters, Mountain View, CA (US); Rudolf Bichler, Eningen (DE); Robert Duerichen, Oxford (GB)

(73) Assignee: Robert Bosch GmbH, Stuttgart (DE)

( * ) Notice: Subject to any disclaimer, the term of this patent is extended or adjusted under 35 U.S.C. 154(b) by 550 days.

(21) Appl. No.: 16/825,787

(22) Filed: Mar. 20, 2020

(65) Prior Publication Data

US 2021/0295150 A1    Sep. 23, 2021

(51) Int. Cl.
*G06N 3/08*     (2023.01)
*G06F 18/24*    (2023.01)
*G06N 3/045*    (2023.01)

(52) U.S. Cl.
CPC ............... *G06N 3/08* (2013.01); *G06N 3/045* (2023.01)

(58) Field of Classification Search
CPC ........ G06N 3/08; G06N 3/0454; G06N 5/003; G06N 20/20; G06K 9/6267
See application file for complete search history.

(56) References Cited

U.S. PATENT DOCUMENTS

| 7,222,075 | B2 |   | 5/2007  | Petrushin |             |
|-----------|----|---|---------|-----------|-------------|
| 11,055,872| B1 | * | 7/2021  | Chen      | G06V 10/764 |
| 2008/0319932 | A1 | * | 12/2008 | Yih    | G06Q 10/06  |
|           |    |   |         |           | 706/20      |
| 2018/0150684 | A1 | * | 5/2018 | Wang     | G06N 3/08   |

FOREIGN PATENT DOCUMENTS

WO    2019020517 A1    1/2019

\* cited by examiner

*Primary Examiner* — Nghia M Doan
(74) *Attorney, Agent, or Firm* — Brooks Kushman P.C.

(57) ABSTRACT

A system and method is disclosed for classifying time-series data provided to a machine-learning model from a continuous sensor signal. The data may be "windowed" or "divided" into a smaller data segment using a first stage classifier where an "event of interest" may be identified. The first stage classifier may employ an algorithm that prohibits false negative identifications. The data segment detected as including an event of interest may then be transmitted to a second stage classifier operable to performs a full classification on the data segment. The multi-stage network may require less power and a less complex structure.

19 Claims, 4 Drawing Sheets

SYSTEM AND METHOD FOR DISTRIBUTED NEURAL NETWORKS ON EDGE DEVICES

TECHNICAL FIELD

The present disclosure relates to a decentralized machine-learning network for detecting and classifying events in sensor signals or edge devices and for providing a full classification when an event of interest is detected.

BACKGROUND

The task of classifying input data using machine-learning based classifiers is understood as being used within various applications. Based on a given application, the machine-learning model used for classification may be extremely large with several tens of millions of variables. Such large networks typically require significant computational processing power and large data storage resources. Consequently, such machine-learning models may have a large energy footprint. Typically, such large machine-learning models aren't deployable in resource constrained settings.

SUMMARY

A system and method are disclosed for a multi-stage machine learning classifier that receives a sensed data signal. The system applies a first stage classifier to parse the sensed data signal into one or more data segments. An event of interest (e.g., a binary classification) may be identified within the one or more data segments using a first machine learning algorithm employed by the first stage classifier. The one or more data segments identified as including the event of interest may be transmitted from the first stage classifier to a second stage classifier. The one or more data segments may then be classified using a second machine learning algorithm employed by the second stage classifier.

The system and method may also be operable to generate a first classification and a first classification label for the one or more data segments using a first machine learning algorithm employed by the first stage classifier. The first classification may be outputted as a full or complete classification if a confidence measure for the first classification exceeds a confidence threshold. If the confidence measure for the first classification is less than the confidence threshold, the first classification and the first classification label may be provided to a second machine learning algorithm employed by a second stage classifier. A second classification for the one or more data segments may then be generated using the second machine learning algorithm employed by the second stage classifier. The second classification may then be outputted as the complete or full classification.

The system and method may also combine the one or more data segments into a common dataset where the event of interest for a first data segment may be the same as the event of interest for a second data segment. The common dataset may then be transmitted from the first stage classifier to the second stage classifier for classification. The sensed data signal may also be parsed into one or more data segments using the second machine learning algorithm. The event of interest may be identified within the one or more data segments using the second machine learning algorithm. The one or more data segments may then be classified using the second machine learning algorithm.

The system and method may also apply a first classification that identifies the event of interest within the one or more data segments. A second classification may identify the event of interest does not exist within the one or more data segments. The one or more data segments labeled using the first classification may then be transmitted to the second stage classifier. The one or more data segments labeled using the first classification may be identified as not including the event of interest. relabeling the one or more data segments using the second classification.

The system and method may also determine the one or more data segments identified as having the event of interest exceed a predefined confidence threshold. The one or more data segments may then be classified if they exceed the predefined confidence threshold using the first machine learning algorithm. The one or more data segments may also be identified as having the event of interest into a categorical dataset using the first machine learning algorithm. The categorical dataset may then be transmitted from the first stage classifier to the second stage classifier. The second machine learning algorithm may then be used to classify the categorical dataset.

A training process may be employed to apply a penalization algorithm to ensure the one or more data segments are biased toward using the first classification. The penalization algorithm may include a first weight applied to the first classification that is larger than a second weight applied to the second classification.

DETAILED DESCRIPTION

Figure 1:
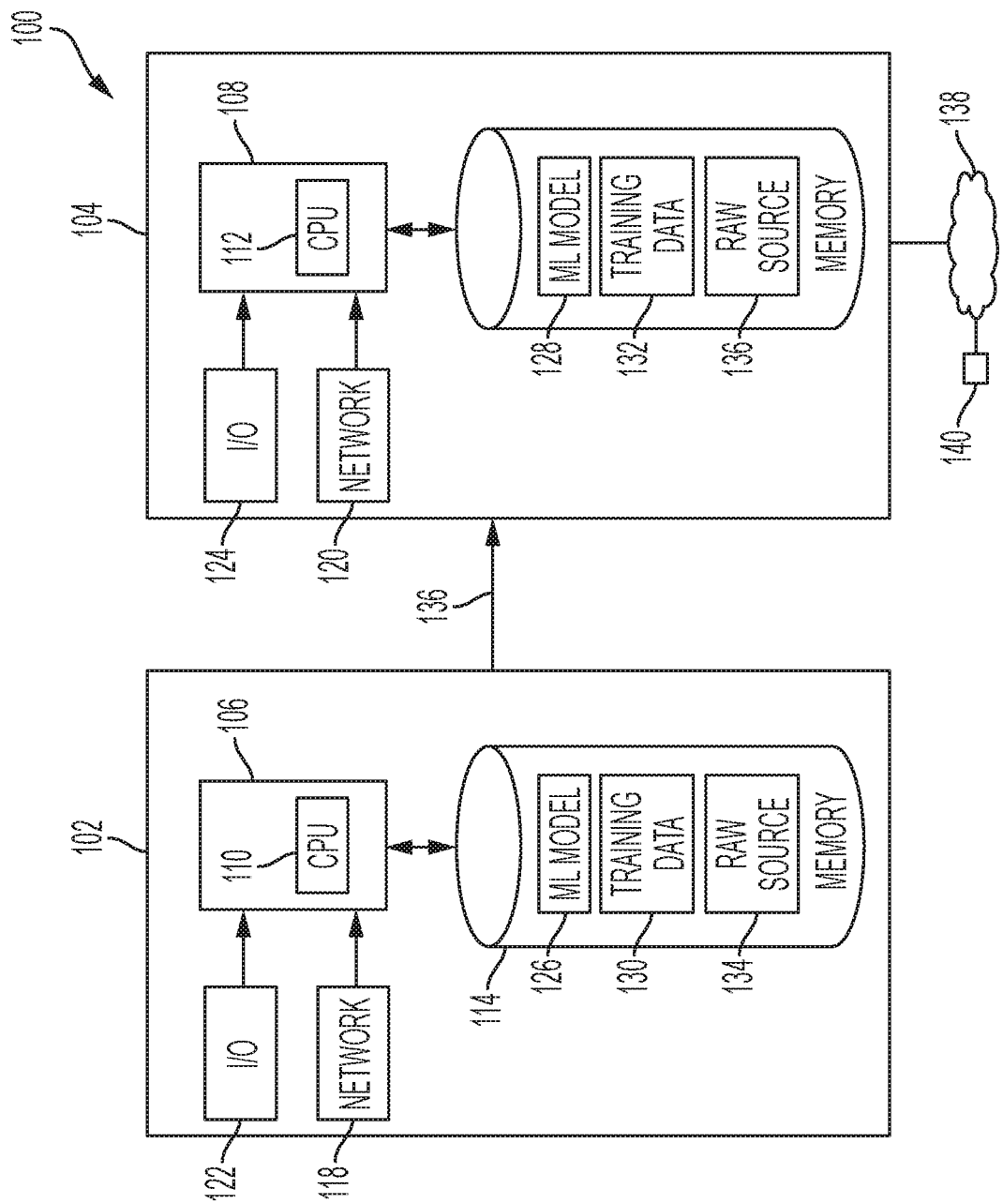
FIG. 1 illustrates an exemplary embodiment of a multi-stage network having a first stage classifier and a second stage classifier.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

For machine-learning algorithms, the use of neural networks (e.g., CNN or DNN) has increased for a wide variety of applications that include classifying input data to provide event detection (e.g., events of interest) or object classification (e.g., object recognition or facial recognition). However, neural networks employed to classify input data may be extremely large and provide results with tens of millions of variables. Such large neural networks typically require significant computation and data storage resources and consequently may consume large amounts of energy to operate or have a large power footprint. Also, current neural networks typically can't be deployed in resource constrained settings (e.g., within wearable devices like smart watches).

It is contemplated that for certain classification applications time-series data provided to the neural networks from a continuous sensor signal may be "windowed" or "divided" into smaller segments. Each data segment may then be classified independently. The time-series data may also be highly sparse (i.e., a portion of the time-series data may have no events of interest requiring classifying). Distinguishing whether the time-series data segment has an "event of interest" does not require the computationally and data storage consuming resources typically needed by a more comprehensive classification stage. It may even be an unnecessary usage of resources to classify a time-series data segment that does not include an event of interest.

It is therefore contemplated that a multi-stage network may be employed with a first stage classifier (i.e., first neural networks) that identifies if a windowed or divided data segment includes an event of interest. The data segment detected as including an event of interest may then be transmitted to a second stage classifier (i.e., second neural networks) that performs a full classification on the data segment. The multi-stage network may require less power and a less complex structure.

FIG. 1 illustrates a multi-stage network 100 having a Stage 1 Classifier 102 and a Stage 2 Classifier 104. As shown, the Stage 1 Classifier 102 and the Stage 2 Classifier 104 may be designed to include at least one processor 106, 108 operatively connected to a respective memory unit 114, 116. Each processor 106, 108 may be one or more integrated circuits that implement the functionality of a respective central processing unit (CPU) 110, 112 that may be a commercially available processing unit that implements an instruction stet such as one of the x86, ARM, Power, or MIPS instruction set families. However, it is contemplated that commercially available processing units is just an example for implementing the Stage 1 Classifier 102 and the Stage 2 Classifier 104. For instance, it is contemplated that CPU 110, 112 may be a specialized accelerator that includes special functions or instructions which are optimized for implementing a machine learning algorithm or neural network (e.g., a CNN or DNN). It is also contemplated that the CPU 110, 112 may be an analog computational unit or a unit that performs computational operations in memory.

During operation, each CPU 110, 112 may execute stored program instructions that are retrieved from the associated memory units 114, 116. The stored program instructions may include software that controls operation of each CPU 110, 112 to perform the operation described herein. In some examples, each processor 106, 108 may be a system on a chip (SoC) that integrates functionality of each CPU 110, 112; each memory unit 114, 116; an associated network interface 118, 120; and an associated input/output interface 122, 124. It is contemplated that the Stage 1 Classifier 102 and the Stage 2 Classifier 104 may implement an operating system for managing various aspects of the operation.

Each memory unit 114, 116 may include volatile memory and non-volatile memory for storing instructions and data. The non-volatile memory may include solid-state memories, such as NAND flash memory, magnetic and optical storage media, or any other suitable data storage device that retains data when the Stage 1 Classifier 102 and the Stage 2 Classifier 104 is deactivated or loses electrical power. The volatile memory may include static and dynamic random-access memory (RAM) that stores program instructions and data. For example, each memory unit 114, 116 may store a machine-learning model 126, 128 or algorithm; and/or raw source data 134, 136. The memory unit 114, 116 may also store values or data (e.g., coefficients, sks, weights) that may then be loaded by the CPU 110, 112 (or the accelerator) for use by the machine-learning model 126, 128. The memory unit 114, 116 may also be used to store associated training datasets 130, 132 that may be used during a training process.

Again, the Stage 1 Classifier 102 and the Stage 2 Classifier 104 may also include an associated network interface device 118, 120. It is contemplated that the network interface device 118, 120 may be configured to provide a communication link 138 between the Stage 1 Classifier 102 and the Stage 2 Classifier 104. Alternatively, the network interface device 118, 120 may be configured to communicate with additional external systems and devices (e.g., sensors). The network interface device 118, 120 may communicate using $I^2C$, SPI, similar methods that allow for communication between microcontrollers, EEPROMs, A/D and D/A converters, I/O interfaces and other similar peripherals in embedded systems. Additionally, the network interface device 118, 120 may be configured to include a wired and/or wireless Ethernet interface as defined by Institute of Electrical and Electronics Engineers (IEEE) 802.11 family of standards. The network interface device 118, 120 may include a cellular communication interface for communicating with a cellular network (e.g., 3G, 4G, 5G).

As further shown the Stage 2 Classifier 104 may communicate with an external network 138 like the world-wide web or the Internet. The external network 138 may establish a standard communication protocol between computing devices. The external network 138 may allow information and data to be easily exchanged between the Stage 2 Classifier 104 and networks. One or more servers 140 may be in communication with the external network 138.

It is also contemplated that the Stage 2 Classifier 104 may be implemented on a server or "cloud" based storage system (e.g., Amazon Web Services). The Stage 1 Classifier 102 may still communicate with the Stage 2 Classifier 104 using communication link 138. For instance, the Stage 1 Classifier 102 may be implemented on a security camera that is operable using network interface device 118 to communicate to a cloud-based storage system through known internet protocols. The Stage 1 Classifier 102 may detect and transmit events of interest (e.g., using communication link 138) to the Stage 2 Classifier 104 (operating on a cloud-based storage system) for further classification.

The Stage 1 Classifier 102 and the Stage 2 Classifier 104 may implement the associated machine-learning algorithms 126, 128 that is configured to analyze the provided or stored raw source data 134, 136 that may include raw or unprocessed sensor data. The raw source data 134, 136 may include video, video segments, images, and raw or partially processed sensor data (e.g., data from digital camera or LiDAR sensor). In some examples, the machine-learning algorithms 126, 128 may be a machine-learning network algorithm (e.g., CNN or DNN) that may be designed to perform a predetermined function.

Figure 2:
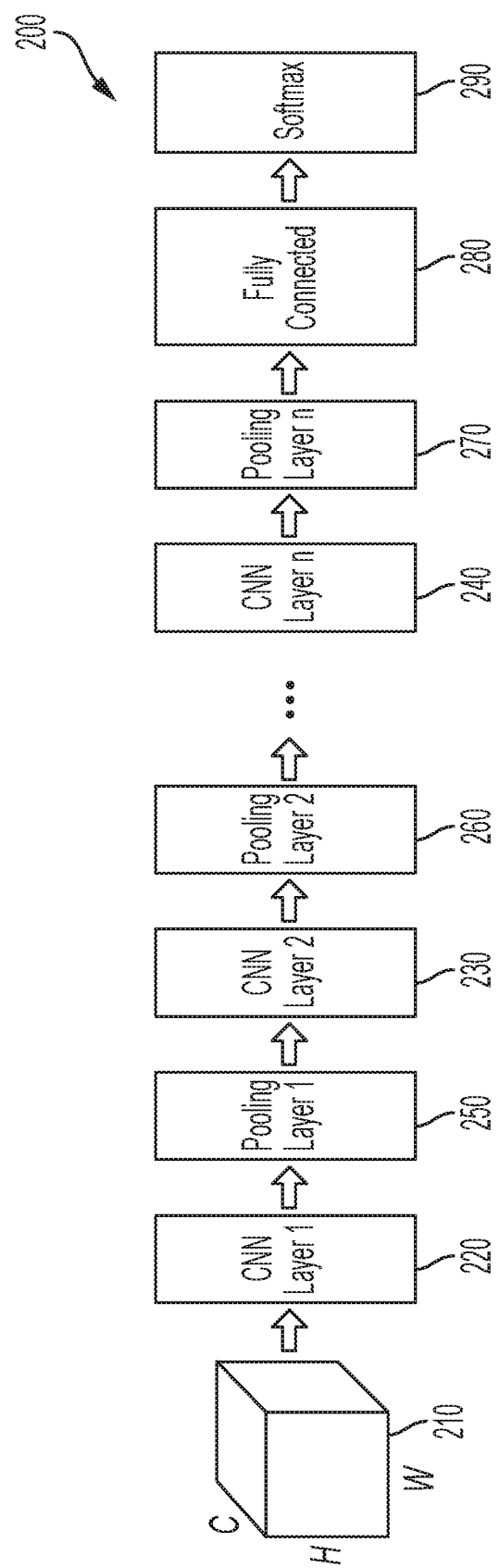
FIG. 2 illustrates an exemplary CNN.

FIG. 2 illustrates an exemplary CNN 200 that may be used by the Stage 1 Classifier 102 and the Stage 2 Classifier 104 for classifying whether a data segment includes an event of interest or to provide a full classification of a data segment. However, the CNN 200 may be just one example of implementing the Stage 1 Classifier 102 and the Stage 2 Classifier 104. For instance, it is also contemplated that the Stage 1 Classifier 102 and the Stage 2 Classifier 104 may be implemented using a decision tree where a feature extractor could provide the data 134, 136. As illustrated, CNN 200 may include one or more convolutional layers 220-240; one or more pooling layers 250-270; one or more fully connected layer 260; and a softmax layer 270. The Stage 1 Classifier 102 and the Stage 2 Classifier 104 may further include additional CNN, DNN, or decision trees depending upon a given application.

CNN 200 may receive data 210 (e.g., data 134, 136 illustrated in FIG. 1) that may include image data, voice data, text data or measurements received from sensors or transducers. The data 210 may also be lightly processed prior to being provided to CNN 200. Convolutional layers 220-240 may be designed to extract features from data 210. For instance, convolutional layer 220-240 may employ filtering operations (e.g., kernels) before passing on the result to the next layer of the CNN 200. The filtering operations may include image identification, edge detection of an image, and image sharpening that are applied when the data 210 received is an image.

The CNN 200 may also include one or more pooling layers 250-270 that receives the convoluted data from the respective convolution layer 220-240. Pooling layers 250-270 may include one or more pooling layer units that apply a pooling function to one or more convolution layer outputs computed at different bands using a pooling function. For instance, pooling layer 250 may apply a pooling function to the kernel output received from convolutional layer 220. The pooling function implemented by pooling layers 250-270 may be an average or a maximum function or any other function that aggregates multiple values into a single value.

Next, one or more fully connected layers 280 may attempt to learn non-linear combinations for the high-level features in the output data received from the convolutional layers 220-240 and pooling layers 250-270. Lastly, CNN 200 may include a softmax layer 290 that combines the outputs of the fully connected layer 280 using softmax functions. It is also contemplated that the CNN 200 may further employ a batch normal layer, a max pooling layer, and a dropout layer.

Figure 3:
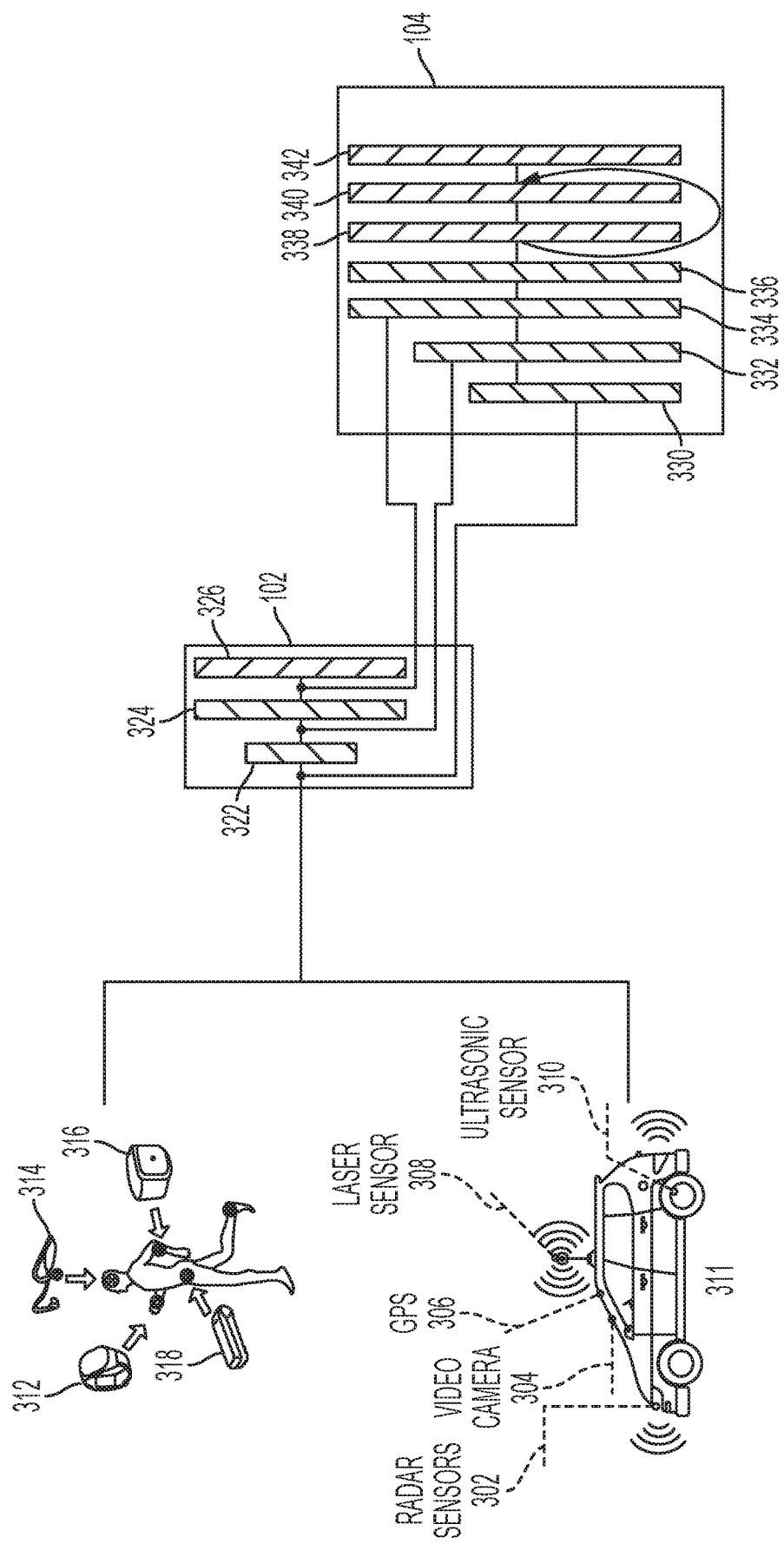
FIG. 3 illustrates another exemplary embodiment of the multi-stage network 100.

FIG. 3 illustrates another exemplary embodiment of the multi-stage network 100 that may be employed to detect and classify events of interest provided from a sensor signal or inputted data (e.g., data 134, 136). As shown, the Stage 1 Classifier 102 employs the machine-learning model 126 to detect an event of interest or activity spotting from one or more of the "windowed" data segments. The Stage 1 Classifier 102 may be operable to generate a binary classification if a relevant activity is identified (i.e., an event of interest). The Stage 1 Classifier 102 may employ an architecture like the CNN 200. Or, the Stage 1 Classifier 102 may employ additional or fewer layers (e.g., convolutional layers, fully connected layers) than shown by the CNN 200. But, as discussed below, it is also contemplated that the Stage 1 Classifier 102 may be operable to perform full or complete classifications on data segments that is determined to be above a predefined confidence threshold.

The Stage 1 Classifier 102 may also be incorporated within one or more sensors or embedded within wearable or edge devices. For instance, within a vehicle 311 the Stage 1 Classifier 204 may be embedded within a radar sensor 302, video camera 304, global positioning system 306, laser sensor 308 (e.g., LiDAR), or ultrasonic sensor 310. Or, the Stage 1 Classifier 102 may be located along side each one of the sensors 302-310. In other words, the Stage 1 Classifier 102 may be included within and unique to each of the sensor 302-310. Alternatively, it is contemplated that Stage 1 Classifier 102 may receive data and be operable for more than one of the sensors 302-310. For instance, the Stage 1 Classifier 102 may be in communication and receive sensed data from more than one of the sensors 302-310. Again, the Stage 1 Classifier 102 may communicate with the sensors 302-310 using $I^2C$, SPI, or a similar communication protocol.

Likewise, the Stage 1 Classifier 102 may be embedded within one or more wearable devices 312-318 (e.g., smart watch, headphones, or heart rate monitor). The wearable devices 312-318 may include numerous sensors (e.g., heart rate monitor, pedometer, accelerometer, or gyroscope). Again, the Stage 1 Classifier 102 may be located within or along-side each sensor within the wearable devices 312-318. Or, the Stage 1 Classifier 102 may be receive data and be operable for more than one of the sensors located within the wearable devices 312-318.

In general operation, the sensors may output a continuous signal of sensed data. The Stage 1 Classifier 102 may be operative to segment this continuous sensed data signal into "windowed" data segments which are either completely independent from other windowed data segments or which may be overlapped or combined with other windowed data segments.

It is also contemplated that the Stage 1 Classifier 102 may be optimized to use a machine-learning network that is less complex and less power consuming than a more robust classification network. For instance, the Stage 1 Classifier 102 may include fewer layers (i.e., fewer convolutional layers 322-324 or fully-connected layers 326) than the machine-learning network employed by the Stage 2 Classifier 104. Again, the Stage 1 Classifier may also be optimized using a decision tree or other known classifiers designed for a given application. The Stage 1 Classifier 102 may then operate to detect an event of interest within each of the windowed data segments or perform a low effort classification of the sensed data or windowed data segments. If the Stage 1 Classifier 102 detect an event of interest (or if the confidence of the classification performed by the Stage 1 Classifier 102 is below a given threshold), the identified windowed data segment may be provided to a Stage 2 Classifier 104 that includes a machine-learning algorithm 128 designed to perform a full or more complex classification.

It is contemplated that to handle a full classification requiring a higher degree of accuracy, the Stage 2 Classifier 104 may be a more complex machine-learning network than the one employed by the Stage 1 Classifier 102. For instance, the Stage 2 Classifier 104 may employ additional layers (e.g., convolutional layers, fully connected layers) for providing a full classification of the data segment transmitted by the Stage 1 Classifier 102. The Stage 2 Classifier 204 may further include a more complex design structure, like a skip architecture 328 (i.e., REsNet architecture) where the output generated by one or more layers (e.g., one of the convolutional layers 330-334) may be provided as an input to another layer (e.g., one of the fully-connected layers 338-342). Also, by employing a less complex network (i.e., the Stage 1 Classifier 102) to handle event detection, the amount of data transmitted to the Stage 2 Classifier 104 may be reduced.

While the Stage 2 Classifier 104 may typically only operate on data segments received from the Stage 1 Classifier 102 it is contemplated that the Stage 2 Classifier 104 may directly receive a continuous sensor signal (i.e., data). In other words, the Stage 2 Classifier 104 may operate independent or without the Stage 1 Classifier 102. The Stage 2 Classifier 104 may operate to window the data into segments; identify events of interest for each data segment; and provide a full classification on the data segments identified as including an event of interest. It is contemplated that the Stage 2 Classifier 104 may be designed to handle identification of events of interest and full classification in the event a sensor or wearable device does not include a Stage 1 Classifier 102. Or, such operation may be necessary if a Stage 1 Classifier 102 becomes inoperable.

It is also contemplated that while operating to perform event detection, the Stage 1 Classifier 102 should be designed to capture and label all events of interest within a windowed data segment. For instance, the Stage 1 Classifier 102 may label the windowed data segment where an event of interest occurs as class "1" and the windowed data segment where no event of interest occurs as class "0." During operation, it may be acceptable if the Stage 1 Classifier 102 labels a data segment from a class "0" to a class "1." But it is contemplated that the Stage 1 Classifier 102 should not mis-label data segments that should (or are already labeled) as class "1" to a label of class "0."

It is understood, that data segments mistakenly identified as class "1" by the Stage 1 Classifier 102 will still be transmitted to the Stage 2 Classifier 104. And, the Stage 2 Classifier 104 may then be operable to identify and correctly label the data segment as a class "0" (i.e., no event of interest needing full classification). But, if a data segment is mistakenly identified by the Stage 1 Classifier 102 as a class "0," the data segment will not be correctly re-labeled as a class "1" because no data will be transmitted to the Stage 2 Classifier 104. It is therefore contemplated that the Stage 1 Classifier 102 should be biased to penalize false negatives (i.e., misclassifications of data segments that should be a class "1" to a class "0").

It is therefore contemplated that the Stage 1 Classifier 102 may be penalized (during a training process) from applying a misclassification by assigning class "1" labeling higher than class "0" labeling using Equation 1 below:

$$-\frac{1}{N}\sum_{i}^{N} w_1 y_i * \ln(\hat{y}_i) + w_0(1 - y_i) * \ln(1 - \hat{y}_i) \quad \text{(Equation 1)}$$

Where, $$-\frac{1}{N}\sum_{i}^{N} w_1 y_i * \ln(\hat{y}_i) \neq 0, \text{ when } y_i = 1, \hat{y}_i = 0: \text{ FALSE NEGATIVE}$$

Where, $$w_0(1 - y_i) * \ln(1 - \hat{y}_i) \neq 0, \text{ when } y_i = 0, \hat{y}_i = 1: \text{ FALSE POSITIVE}$$

It is contemplated that $y_i$ may be the actual label associated with the $i^{th}$ segment and $\hat{y}_i$ may be the output label predicted by the neural network. The terms $w_1$, $w_0$ may be the weights associated with the false negatives and false positives respectively that are used during the training process. It is contemplated that during the training process the terms $w_1$, $w_0$, may be adjusted to penalize false negatives. For instance, the Stage 1 Classifier 102 may be trained to ensure $w_1 > w_0$. It is also contemplated that the values used by Equation 1 may be selected to achieve an acceptable low false negative rate (e.g., <3%) while attempting to achieve false positive rates that are below a required threshold. When there are equal numbers of training samples (e.g., training data 130) available for both class "0" and class "1," the Stage 1 Classifier 102 may have a low false negativity rate when $w_1 = 1$ and $w_0 = 0.1$. But the values of $w_1$ and $w_2$ may be assigned different values depending on the application or process.

It is also contemplated that a full classification process may also be employed by the Stage 1 Classifier 102. The Stage 1 Classifier 102 may perform the full classification process by handling less complex classification samples that may not require a large amount of computational processing power. For instance, the machine-learning model 126 deployed by the Stage 1 Classifier 102 may reutilized by using a portion of the existing layers (e.g., convolutional layers) and introducing one or more additional output layers to perform a complete classification. Or, the existing layers may be used with additional fully-connected layers to perform a complete classification.

It is contemplated that the output of the layer up to which the network is common for the Stage 1 Classifier 102 may be used as an input to the additional layers which may then be used to perform a full classification. The reuse of the pre-computed output may not significantly increase the complexity of the Stage 1 Classifier 102 to perform the full classification. For the multi-class classification, the output of the last layer of the Stage 1 Classifier 102 may provide the probabilities/confidence of the network towards each class. It is contemplated that the output for the $i^{th}$ input segment may be given as $\widehat{y2}_i$.

It is also contemplated that the Stage 1 Classifier 102 may be designed to handle the full or complex classification by determining if the windowed data segments are above or within a predefined confidence threshold (e.g., a confidence level approximately equal to or greater than 90% or between 80%-90%). For windowed data segments that the Stage 1 Classifier 102 is able to perform classification with a high confidence (e.g., greater than a confidence level of 90%), may not need further classification by the Stage 2 Classifier 104. However, if the windowed data segments are below the predefined confidence threshold (e.g., data samples less than a confidence level of 90%) the Stage 1 Classifier 102 may transmit the data segments to the Stage 2 Classifier 104 for full or more complex classification.

Figure 4:
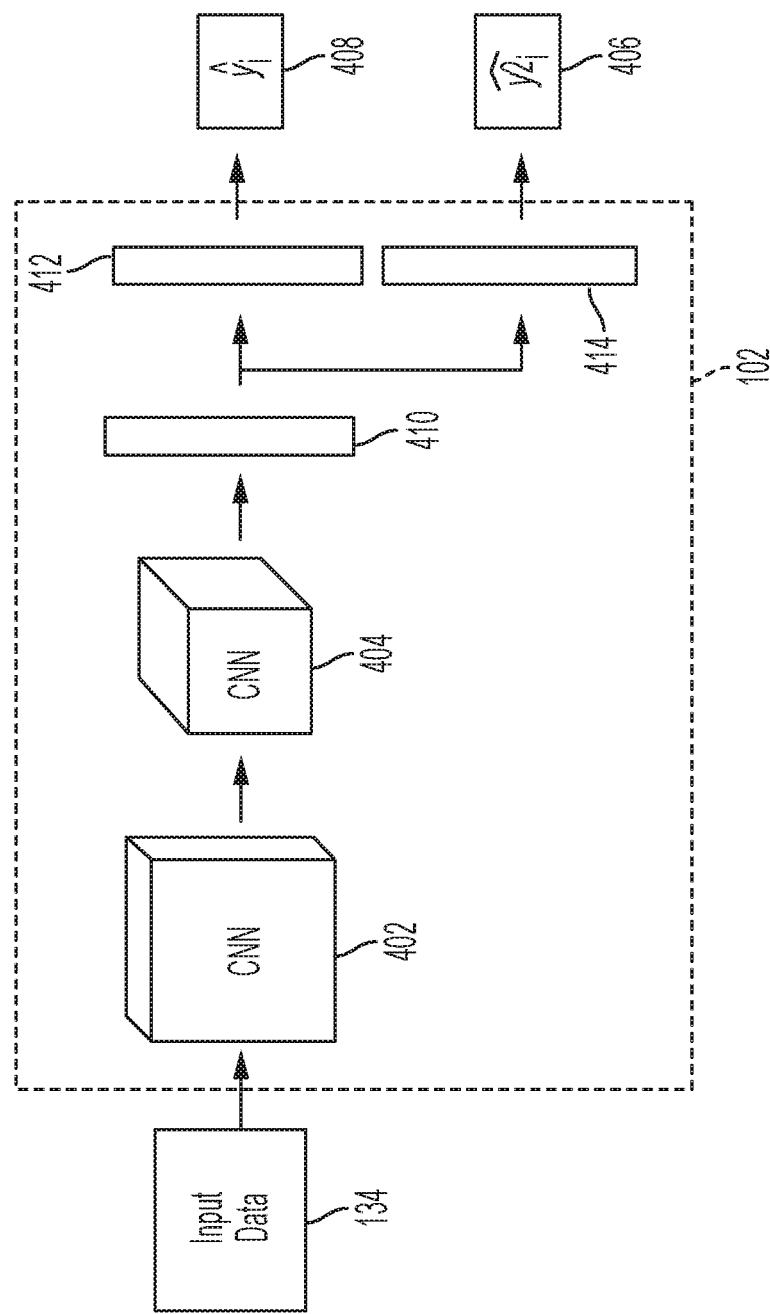
FIG. 4 illustrates an alternative embodiment of the first stage classifier.

FIG. 4 illustrates an example of the Stage 1 Classifier 102 being operable to handle both an event binary-based classification (that will be transmitted to the Stage 2 Classifier 104) and a lower and complex classification for data segments based on a confidence threshold. As illustrated, the Stage 1 Classifier 102 may receive input data (e.g., data 134). The Stage 1 Classifier 102 may then include a first convolutional filter 402 and a second convolutional filter that extracts features which may be classified with one or more fully connected layers. For instance, fully connected layers 410, 412 may be used to generate output 408 which may include a less complex or broad categorical classification of a data segment. Alternatively, fully connected layers 410, 414 may be operable to generate output 406 which may include a more complex, full, or fine categorical classification of the data segment.

For instance, the Stage 1 Classifier 102 may perform a categorical classification of the data segment into a specified group (e.g., animal, transportation, or food), the categorized data segment may then be transmitted to the Stage 2 Classifier 104 for full classification of the assigned group. The Stage 1 Classifier 102 may determine the windowed data segment belongs to an "animal" classification group, the Stage 2 Classifier 104 may then provide a full classification that the windowed data segment is an image of a "dog." By operating to provide a broad categorical group classification, the Stage 1 Classifier 102 may increase the confidence of the full classification.

It is also contemplated that the Stage 1 Classifier 102 generally may be designed to have a very low density. As such, the Stage 1 Classifier 102 may not yield high accuracy when performing full classifications across all data segments. Instead, the Stage 1 Classifier 102 may only be highly accurate performing full classifications for a smaller number of data segments when the probability/confidence associated may be high. For instance, when the confidence is high, the Stage 1 Classifier 102 may generate an output classification 406 (i.e., full classification). If the confidence level is low, the Stage 1 Classifier 102 may output a low effort classification label to the Stage 2 Classifier 104 for full classification.

The Stage 1 Classifier 102 may determine whether to perform lower or more complex classification using logic Equations 2 and 3 below:

$$\text{output class: } i^* = \underset{i}{\text{argmax}} \; \hat{y2}_i \; \text{ if } \hat{y2}_i > \text{threshold} \quad \text{(Equation 2)}$$

$$\text{else, } i^* = \text{output Stage 2} \quad \text{(Equation 3)}$$

As illustrated, if the Stage 1 Classifier 102 provides a classification where the confidence threshold is high (e.g., greater than 90%), the classification from the Stage 1 Classifier 102 is used. However, if the Stage 1 Classifier 102 provides a classification where the confidence threshold is not high (e.g., less than 90%), a low effort classification label is assigned, and the data segment is transmitted to the Stage 2 Classifier for a full or more complex classification.

Alternatively, it is also contemplated that the Stage 1 Classifier 102 may determine if the data segment having an event of interest has a probability confidence that is above the predefined threshold (e.g., 90%). If yes, the Stage 1 Classifier 102 may generate an output classification 406. If no, the output data segment 408 may be transmitted to the Stage 2 Classifier 104. Again, the addition of an extra layer for full classification, additional layers can be added to the Stage 1 Classifier 102 to perform broad/fine categorical classification.

It is contemplated that since most of the Stage 1 Classifier 102 may be common for event detection or full classification (or some broad categorical classification), it may be beneficial to train the common layers of the machine-learning model 126 for the full classification task (instead of the binary classification task). It is contemplated that full classification may be a more complex and training for the more complex problem improves the discriminatory power of the network. Thus, the initial layers of the Stage 1 Classifier 102 network (which are generally considered to perform feature extraction) extract features more relevant for the full classification task. Since event detection or binary classification is a subset of the full classification problem, the extracted features may also be operable for detection.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for a multi-stage machine learning classifier, comprising:
    receiving a sensed data signal;
    applying a first stage classifier to parse the sensed data signal into a plurality of data segments;
    applying a first machine-learning algorithm to each of the plurality of data segments to detect whether the data segment includes an event of interest;
    responsive to detecting by the first machine-learning algorithm that one or more of the plurality of data segments includes the event of interest, transmitting the one or more data segments that include the event of interest from the first stage classifier to a second stage classifier; and
    classifying the one or more data segments using a second machine learning algorithm employed by the second stage classifier, the second machine learning algorithm being trained to perform a full classification of the plurality of data segments when the first classifier is inoperable.

2. The method of claim 1, wherein the first stage classifier generates a binary classification to detect whether a data segment includes the event of interest.

3. The method of claim 1 further comprising:
combining the one or more data segments into a common dataset, wherein the event of interest for a first data segment matches the event of interest for a second data segment;
transmitting the common dataset from the first stage classifier to the second stage classifier; and
classifying the common dataset using the second machine learning algorithm.

4. The method of claim 1 further comprising:
parsing the sensed data signal into one or more data segments using the second machine learning algorithm;
identifying the event of interest within the one or more data segments using the second machine learning algorithm; and
classifying the one or more data segments using the second machine learning algorithm.

5. The method of claim 1 further comprising:
applying a first classification that identifies the event of interest within the one or more data segments; and
applying a second classification that identifies the event of interest does not exist within the one or more data segments.

6. The method of claim 5 further comprising:
transmitting the one or more data segments labeled using the first classification to the second stage classifier.

7. The method of claim 6 further comprising:
identifying that the one or more data segments labeled using the first classification does not include the event of interest; and
relabeling the one or more data segments using the second classification.

8. The method of claim 5 further comprising:
applying a penalization algorithm during a training process to ensure the one or more data segments are biased toward using the first classification.

9. The method of claim 8, wherein the penalization algorithm includes a first weight applied to the first classification that is larger than a second weight applied to the second classification.

10. The method of claim 1 further comprising:
determining the one or more data segments identified as having the event of interest exceed a predefined confidence threshold; and
classifying the one or more data segments that exceed the predefined confidence threshold using the first machine learning algorithm.

11. The method of claim 1 further comprising:
classifying the one or more data segments identified as having the event of interest into a categorical dataset using the first machine learning algorithm;
transmitting the categorical dataset from the first stage classifier to the second stage classifier; and
classifying the categorical dataset using the second machine learning algorithm.

12. A system for a multi-stage machine learning classifier, comprising:
a sensor operable to generate a sensed data signal;
a first stage classifier comprising a first controller operable to:
receive the sensed data signal from the sensor;
parse the sensed data signal into a plurality of data segments;
responsive to identifying an event of interest within one or more data segments of the plurality of data segments using a first machine learning algorithm, transmit the one or more data segments in which the event of interest is identified from the first stage classifier to a second stage classifier;
the second stage classifier comprising a second controller operable to:
receive the one or more data segments; and
classify the one or more data segments using a second machine learning algorithm, the second stage classifier being trained to perform a full classification of the plurality of data segments when the first classifier is inoperable.

13. The system of claim 12, wherein the first machine learning algorithm includes one or more convolutional layers and one or more fully-connected layers.

14. The system of claim 12, wherein the second machine learning algorithm includes one or more convolutional layers and one or more fully-connected layers.

15. The system of claim 12, wherein the first stage classifier generates a binary classification to identify the event of interest within the one or more data segments.

16. The system of claim 12 further comprising:
the first controller is operable to:
combine the one or more data segments into a common dataset, wherein the event of interest for a first data segment matches the event of interest for a second data segment;
transmit the common dataset from the first stage classifier to the second stage classifier; and
the second controller is operable to:
classifying the common dataset using the second machine learning algorithm.

17. The system of claim 12 further comprising:
the second controller is operable to:
parse the sensed data signal into one or more data segments;
identify the event of interest within the one or more data segments using the second machine learning algorithm; and
classify the one or more data segments using the second machine learning algorithm.

18. The system of claim 12 further comprising:
apply a first classification that identifies the event of interest within the one or more data segments; and
apply a second classification that identifies the event of interest does not exist within the one or more data segments.

19. A method for a multi-stage machine learning classifier, comprising:
receiving a sensed data signal;
applying a first stage classifier to parse the sensed data signal into one or more data segments;
generating a first classification and a first classification label for the one or more data segments using a first machine learning algorithm employed by the first stage classifier;
outputting the first classification as a final classification if a confidence measure for the first classification exceeds a confidence threshold;
providing the first classification and the first classification label to a second machine learning algorithm employed by a second stage classifier when the confidence measure for the first classification is less than the confidence threshold, the second machine learning algorithm r being trained to perform a full classification of the plurality of data segments when the first classifier is inoperable;

generating a second classification for the one or more data segments using the second machine learning algorithm employed by the second stage classifier; and outputting the second classification as the final classification.

\* \* \* \* \*